Patented Sept. 5, 1933

1,925,824

UNITED STATES PATENT OFFICE 1,925,824

METHOD OF OPERATING FILTERS

Willie L. South and Charles T. Anné, Port Arthur, Tex., assignor to The Texas Company, New York, N. Y., a corporation of Delaware No Drawing. Application December 3, 1929
Serial No. 411,384

3 Claims. (Cl. 196—147)

The present invention relates to a method of operating filters in the filtration of petroleum oils and relates more specifically to a method of operating a pressure or vacuum filter press and for safely and economically removing therefrom such solid materials as may have gathered on the filtering surfaces during a filtering operation.

In the contact filtration of petroleum oils it is customary to add a desired amount of finely divided adsorptive clay to the oil and, after contacting and preferably heating the admixture, pass it through a filter press to filter out the finely divided solid material and the carbon-like constituents which might have been adsorbed or absorbed from the oil.

As this filtering operation is carried on a cake of the finely divided solids gradually collects on the filtering surfaces and eventually tends to clog the filtering elements to such an extent that it becomes expensive to continue the operation and consequently it is necessary to temporarily discontinue the operation and open the filter and remove the cake.

When treating relatively viscous oils by this method it may be desirable to use a non-viscous diluent or cut-back medium, such for example as a refined naphtha, for reducing the viscosity of the oil undergoing treatment so that it will be more filterable than it would be in its undiluted or uncut state. After the filtering operation it is desirable to flush the filter with a flushing medium preferably of the same characteristics as the diluent. Ordinarily such a diluent and flushing medium is of comparatively low flash point, consequently there are certain fire hazards attached to opening the filter press and permitting the influx of air especially if the interior of the press is above the flash point of the flushing medium employed.

Our invention accordingly contemplates the removal or displacement of the low flash point medium which remains in the filter press and in the cake formed on the filtering surfaces when the operation of the filter is discontinued temporarily for removing the cake.

Heretofore a number of different methods have been employed for putting the press in condition to open for cleaning by removing or displacing the oil from the filter press to prevent muss when opening or to prevent loss of the oil, such as drawing off the oil, cooling the filter press and afterward blowing with air or drawing off the oil and passing steam through the filter press or simply cooling the filter press and then removing the oil and cake from the filtering surfaces and otherwise cleansing the filter. None of these methods have proven highly successful and some of them entail considerable loss of time. One method has been provided for the express purpose of recovering the valuable oil left in the cake, but which is not relevant to the present invention, whereby the valuable oil left in the cake is displaced by a less viscous refined oil and is later reclaimed.

According to our process immediately the filter rates are slowed down to such an extent, by the collection of cake on the filtering surfaces, that it is not profitable to operate the filter longer, the supply of admixture to the filter is cut off and a stream of pure refined naphtha is passed through the filter and this flushing naptha together with the oil contained in the filter may be conducted to the same storage as the cut-back filtrate. In fact this wash filtrate comprises somewhat similar constituents except that the proportion of the more viscous oil rapidly diminishes. Pure naphtha is delivered to the filter only for a short time, that is just long enough to displace all of the valuable oil. As soon as this is accomplished the flushing naphtha supply is cut off and a so called neutral oil, such as a gas oil or a very light lubricating oil fraction, having a much higher flash point than the flushing medium, is delivered to the filter press and forced through the filtering elements to thereby displace the substantially pure naphtha contained in the filter press and in the cake. The neutral oil, which contains a considerable proportion of the naphtha in the beginning of this step, is diverted away from the previously filtered diluted oil and conducted to separate tankage. This operation is kept up until the filter press is free of the low flash point or volatile diluent or flushing medium.

At this juncture the displacing medium supply may be shut off and a quantity of air or another inert gas may be passed through the filter at proper velocity to blow all of the remaining oils out of the cake and the filter and at once the filter may be opened and further cleaned without risk of disastrous fire or loss of life.

It is preferable to use an unrefined neutral oil or displacing medium, as previously mentioned, since an unrefined oil is less expensive than a refined oil. An oil of the character contemplated will tend to hold the cake together in compact form while the blowing operation is going on and even after it is completed. This is very desirable since if the cake dried and disintegrated upon blowing there would be caused, upon the opening of the filter, an expensive loss of recoverable and reusable material as well as an unhealthy atmosphere for workmen. At the same time by the use of this high flash point displacing medium all of the low flash point constituents are removed from the filter press and it may even be opened before blowing, if preferable, without undue fire hazard.

Obviously many modifications and variations of the invention, as hereinbefore set forth, may be made without departing from the spirit and scope thereof, and therefore, only such limitations should be imposed as are indicated in the appended claims.

We claim:

1. In the method of filtering admixed adsorptive material from mineral lubricating oil wherein the adsorptive material is deposited on a filtering surface to form a filter cake, the steps comprising passing a relatively highly volatile solvent of the nature of petroleum naphtha through the filter and filter cake to remove adhering lubricating oil from the cake, discontinuing the passing of said solvent through the filter and cake and then forcing a relatively low volatile oil substantially of the nature of gas oil or light lubricating oil through the filter cake to remove the volatile solvent remaining therein.

2. The method of filtering a petroleum oil to separate admixed adsorptive material which comprises, passing the oil through a filter whereby the adsorptive material is retained as a cake on the filtering surface, passing a relatively low flash point solvent of the nature of petroleum naphtha through the filter to displace and remove oil remaining in the cake, discontinuing the passing of said solvent through the filter and cake, passing a relatively high flash point oil through the filter to displace from the cake the lower flash point solvent, and thereafter passing an inert gas through the filter to displace said high flash point oil from the cake.

3. The method of filtering a petroleum oil to separate admixed adsorptive material which comprises, passing the oil through a filter whereby the adsorptive material is retained as a cake on the filtering surface, passing petroleum naphtha through the filter to displace and remove oil remaining in the cake, discontinuing the passing of said solvent through the filter and cake, passing gas oil through the filter to displace the naphtha from the filter cake, thereafter passing an inert gas through the filter to displace said gas oil from the cake.

WILLIE L. SOUTH.
CHARLES T. ANNÉ.